Patented Oct. 19, 1937

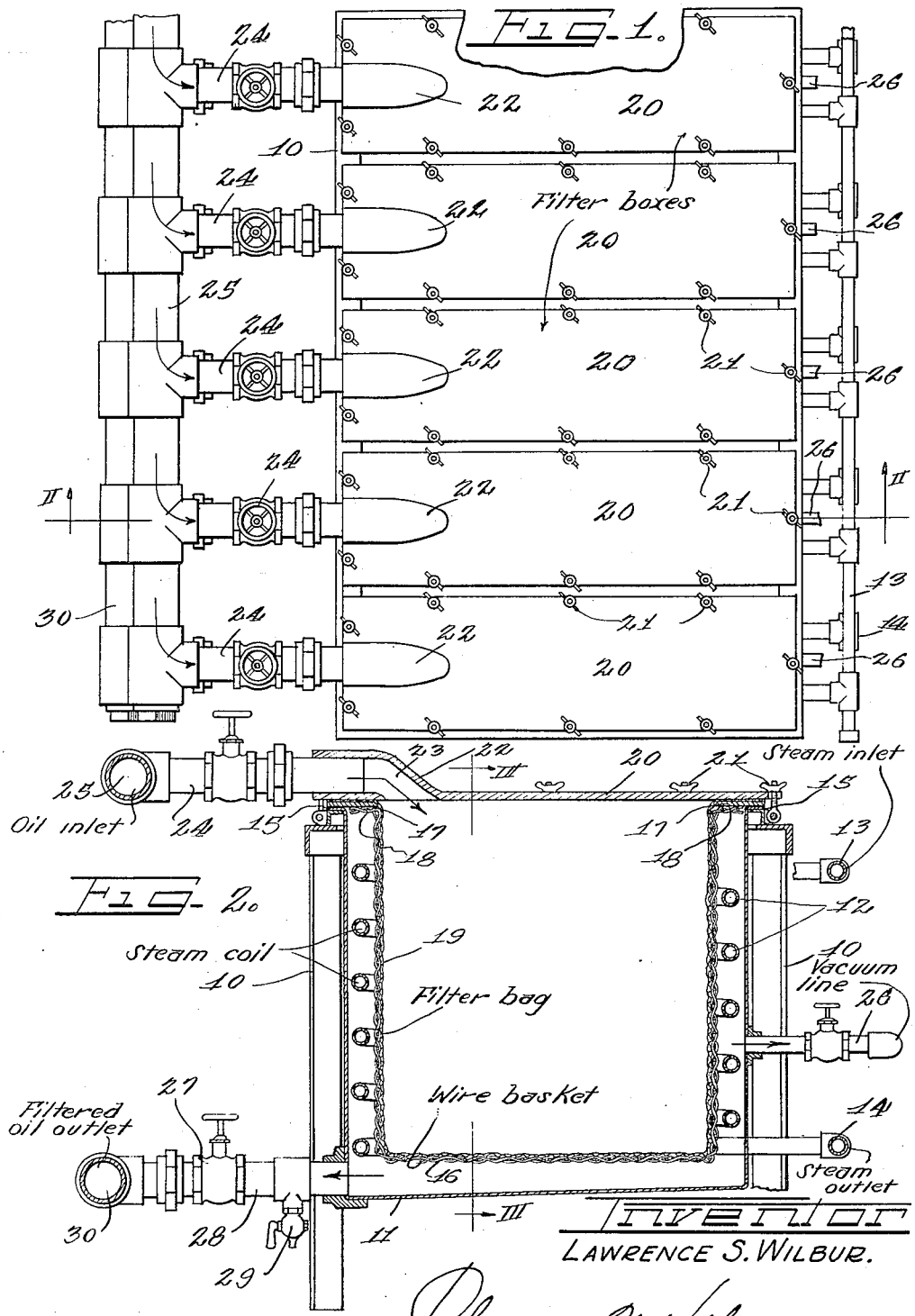

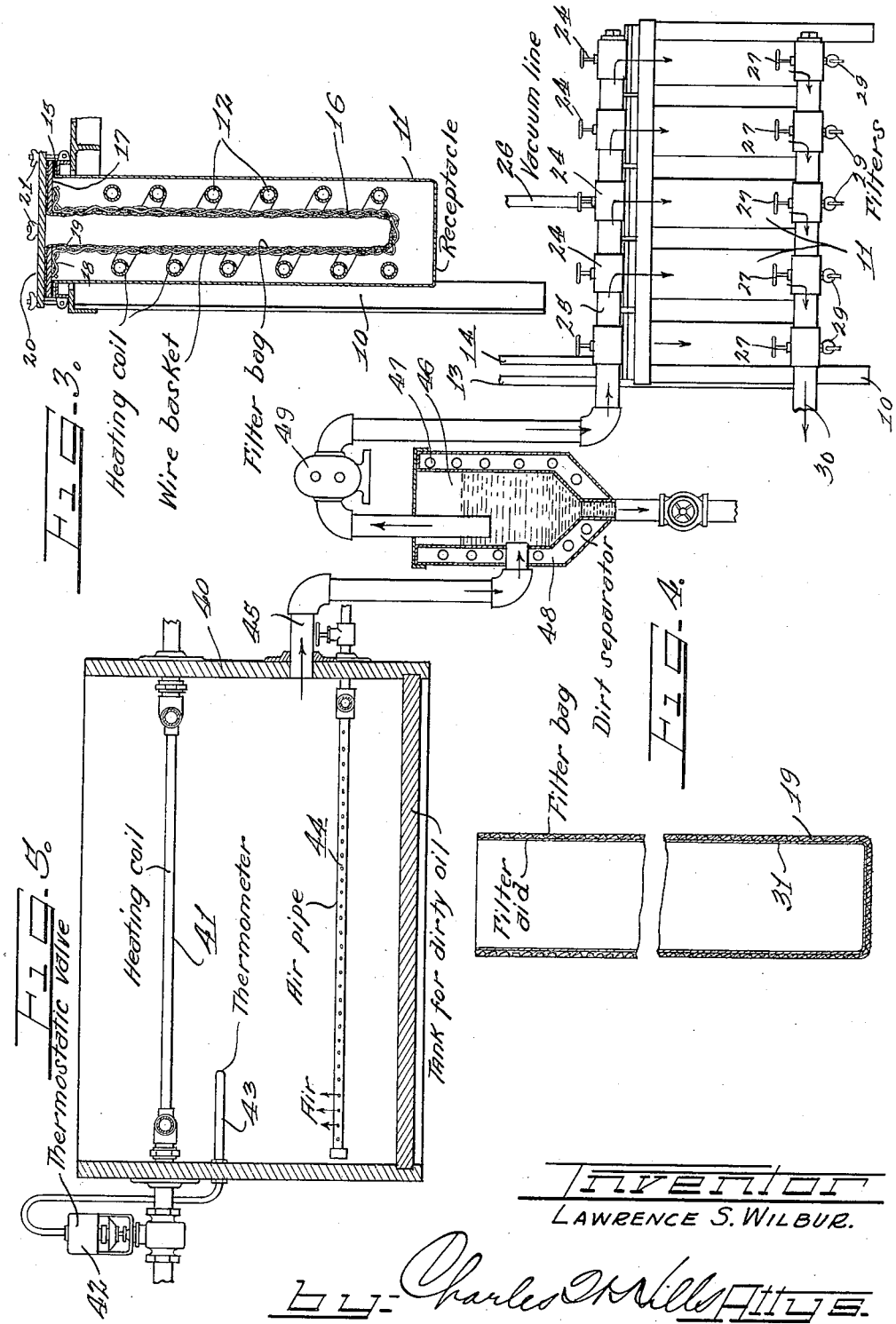

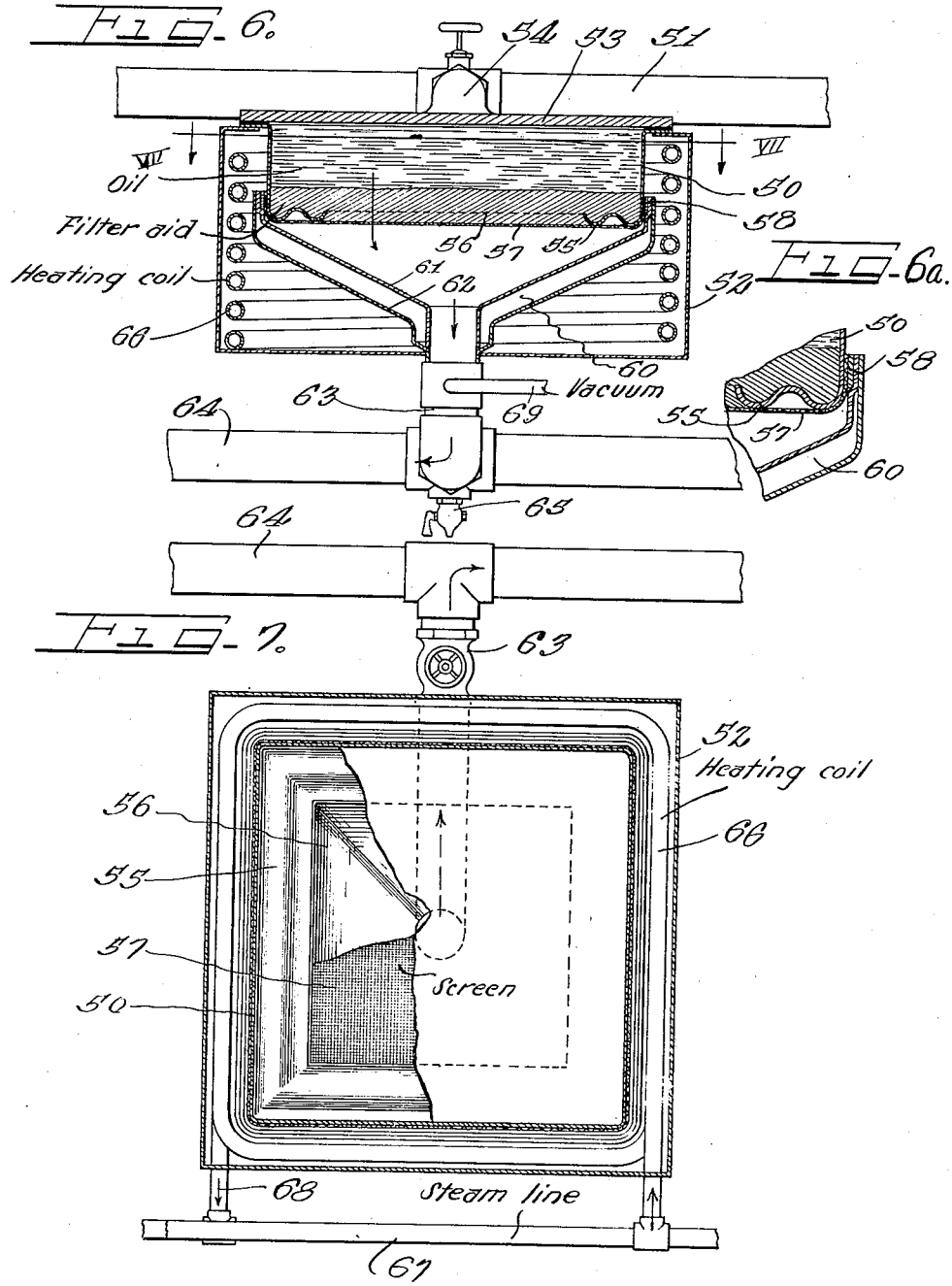

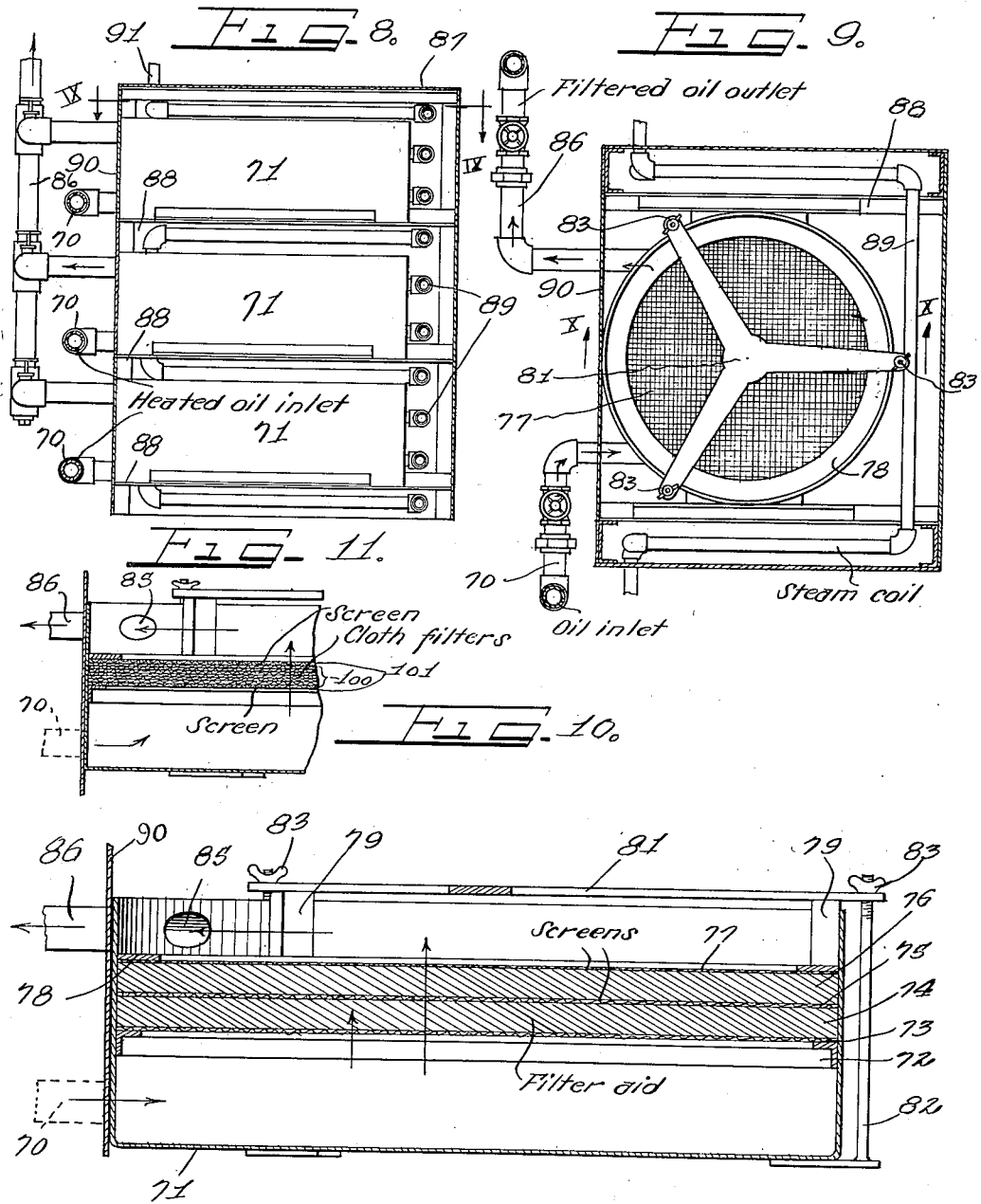

2,096,220

UNITED STATES PATENT OFFICE 2,096,220

PROCESS OF CLEANING DIRTY OIL

Lawrence S. Wilbur, Evanston, Ill.

Application April 28, 1933, Serial No. 668,393

1 Claim. (Cl. 196—16)

This invention relates to an apparatus and process for filtering liquids containing difficultly filterable solids in suspension.

More specifically, this invention relates to a filter apparatus especially adapted for economically filtering hot oily suspensions. The invention specifically includes a process for filtering dirty oils such as are recovered from oil soaked waste used to lubricate journals of railroad rolling stock.

It is well known that the journal boxes of railroad rolling equipment are seldom maintained in a dust and water-tight condition, even when new. The dust guards frequently become broken or loose, or the inspection covers are allowed to remain open at times, thereby facilitating the entrance of dirt and moisture into the boxes.

As a result, the journal box lubricating packing, consisting of various kinds of cotton and wool waste, sometimes mixed with vegetable fibers, and impregnated with from two to four parts of oil for lubrication becomes contaminated with large amounts of foreign matter. Appreciable quantities of moisture, as well as free water, also enter the journal boxes. The moisture and free water become emulsified with the oil during the many months that the lubricating packing is in service and a grinding effect, produced between the rotating journal and the bearing support, grinds the solid foreign matters into a very fine condition. In addition a certain part of the oil bodies becomes carbonized or oxidized during use. This carbon is ground into extremely fine particles and together with the dirt forms a pigment which is practically impossible to separate from the oil under ordinary filtering conditions.

Many other foreign substances find their way into the journal boxes, such as bits of babbit from the bearing, particles of brass removed from the bearing support, fillers used in greases used in the treatment of hot boxes and dyes from the colored waste fibers. These foreign materials, as pointed out above, produce an emulsion with the oil and water rendering the oil unfit for further use.

In my copending application, Serial No. 655,451, filed February 6, 1933, now U. S. Patent No. 2,047,448, granted July 14, 1936, I have described and claimed a process for washing dirty waste from the journal boxes with hot oil maintained in a dry condition. The wash oil dissolves the dirty oil from the waste and holds the dirt and other foreign matter in suspension or solution. Eventually the wash oil becomes so dirty that it must be replaced or purified before it is fit for further usage. The wash oil also extracts the dirty lubricating oil in the waste packing.

I have found that the lubricating and washing properties of the wash oil and the oil recovered from the waste can be restored by a filtering operation if the oils are maintained in a dry condition. If water is present in the oil, the foreign materials form emulsions and slimes which cannot be removed except by expensive treatments. Some satisfactory results have been secured by chemical treatment and by distillation but the costs of such treatments are prohibitive in the recovery of the cheap grades of oil ordinarily used for lubricating the journals of railroad rolling stock. Centrifugal methods of separating the foreign materials from the oils have been partly successful but the oil produced by these methods is not entirely free of contamination.

It is therefore an object of this invention to completely remove all of the contamination contained in dirty oils without changing the characteristics of the oil.

It is another object of this invention to provide a process for the complete purification of dirty lubricating oils without chemical treatment.

Another object of this invention is to provide a process for economically cleaning dirty oils by filtration methods.

Another object of this invention is to provide apparatus for quickly filtering dirty lubricating oils.

It is another object of this invention to provide a filter apparatus adapted to quickly filter fine solids from oils containing such solids in suspension.

Another object of this invention is to provide a filter apparatus for filtering oils in a heated and highly fluid condition.

Other and further objects of this invention will become apparent as the description proceeds.

This invention, in a preferred form, is illustrated in the accompanying drawings and more fully hereinafter described.

On the drawings:

Figure 1 is a plan view of apparatus according to this invention showing a plurality of filtering units connected with a common supply means for handling large volumes of dirty liquids.

Figure 2 is a cross-sectional view taken substantially along the line II—II of Fig. 1.

Figure 3 is a sectional view taken substantially along the line III—III of Fig. 2.

Figure 4 is an enlarged broken sectional view of a filter basket which is impregnated on its inner surface with a filter aid.

Figure 5 is a sectional view partly in elevation of a drying tank for heating and removing water from the oil to be filtered, showing the manner in which the dried oil is passed through a settling tank and fed to the filter apparatus.

Figure 6 is a sectional view of an alternative form of filter apparatus according to this invention.

Figure 6A is a detailed sectional view showing the manner in which the filter cloth or screen is secured to the container.

Figure 7 is a sectional view taken substantially along the line VII—VII of Fig. 6, partly broken away and in elevation.

Figure 8 is a sectional view of another alternative form of filter apparatus according to this invention.

Figure 9 is a sectional view taken substantially along the line IX—IX of Fig. 8.

Figure 10 is a sectional view taken substantially along the line X—X of Fig. 9.

Figure 11 is a fragmentary, sectional view of a modification of the device shown in Figs. 8 to 10.

As shown on the drawings:

In Figs. 1, 2, 3, and 5 the reference numeral 10 indicates a supporting frame for a plurality of rectangular containers or receptacles 11. Each receptacle 11 has disposed therein a heating coil 12, preferably fed with steam from a steam pipe 13. The condensed steam is drained through a condensate line 14.

The containers 11 have an open top and are preferably flanged around the top edge as shown at 15 for resting on the frame 10 to support the receptacle 11 thereon.

A wire mesh basket or screen 16 is suspended in the container 11 within the coils 12. The basket 16 is welded to a metal plate or ring 17 resting on top of the flange 15 as shown at 18 (Figures 1 and 2). The wire basket 16 is therefore suspended within the receptacle 11 in spaced relation from the inner walls thereof and also in spaced relation from the coils 12 disposed within the receptacle.

A filter bag 19 (Figures 2 and 3) is inserted in the basket 16 and supported by said basket. The top edges of the filter bag are extended over the ring 17 and securely clamped by means of a cover plate to be hereinafter described.

Each receptacle 11 is provided with a cover plate 20 which is fastened to the receptacle by means of bolts and wing nuts 21. The heads of the bolts are secured to the frame 10 and thus, when the cover plates 20 are fastened to form an airtight seal for the receptacle 11, the receptacles are also tightly secured to the frame 10.

Each cover 20 preferably has a raised portion 22 for forming a port 23 allowing the passage of liquids to be filtered. The liquids are fed to the port 23 from valved branch pipes 24 supplied from a main header pipe or feed pipe 25 which is connected with the dirty oil supply.

If desired a vacuum line 26 may be connected with each receptacle 11 as shown in Figures 1 and 2. Vacuum may thus be used to partially evacuate the chamber 11 so as to create a pressure differential between the inside of the filter bag 19 and the chamber 11. Furthermore the oil may be pumped or otherwise forced into the filter bag to increase the pressure differential. It is obvious that gravity means alone may be used, allowing the oil to seep through the filter bag and drain therefrom by gravity.

The filtrate is drained from the bottom of the receptacles 11 through valved branch pipes 27 preferably equipped with a glass section 28 (Figure 2) for visible inspection of the clarity of the filtrate flowing therethrough.

A valve or petcock 29 is provided to allow for the withdrawal of samples whenever desired. This valve may also be used when starting up the filtering operation since the first portion of the liquid coming from the filter bag may be cloudy and may not be as clean as is desired. As a filter cake builds up on the filter bag the filtrate becomes clear and the petcock 29 may then be closed allowing the clear liquor to flow into the main drain pipe 30.

As shown in Figure 4, if desired, the filter bags 19 may be impregnated on their inner surfaces with a filter aid material 31. Thus a bag of relatively coarse weave such as a coarse canvas bag may be used as a very fine filtering medium by coating its inner surface with a filter aid material such as fuller's earth, charcoal, or any other filter aid known to the chemical industry.

As shown in Figure 5, the contaminated oils containing moisture, free water and foreign solid materials are placed in an open top tank 40 equipped with a heating coil 41 near the top thereof. The oil is heated to a predetermined temperature and maintained at this temperature by a thermostatic valve controlling the amount of steam entering the coil 41. The valve 42 is operated by a thermometer 43 within the tank. Air is introduced through a perforated coil 44 near the bottom of the tank and the bubbling of the air through the oil and the maintenance of high temperatures in the oil bath (preferably above the boiling point of water) causes a quick dehydration or drying of the oil.

The dried oil is then allowed to flow into a dirt separator tank 46 through the drain line 45. The separating tank 46 is preferably surrounded with steam coils 47 and is encased in an insulated box or receptacle 48. The oil is maintained in a heated condition and some of the larger dirt particles precipitate in the tank 46. The oil is then pumped from near the top of the tank 46 by means of a pump 49 to the filter apparatus described above.

The removal of water and moisture from the oil destroys the emulsions and slimes and makes possible a separation of the foreign matter from the oil by filtration. The maintenance of high temperatures during the filter operation produces high fluidity.

As shown in Figures 6 and 7 an alternative form of filter apparatus may be used in my process. In this apparatus the materials to be filtered are fed to a container 50 through a feed pipe 51. The container 50 is supported in a box 52 and is covered with a cover plate 53 having a port 54 for the introduction of liquids therethrough. The cover plate 53 may be secured to the container 50 in any suitable manner or may merely rest thereon.

The container 50 has a corrugated flanged edge 55 at the bottom thereof extending inwardly for a distance to define an opening 56. A wire screen or canvas 57 is stretched across the opening 56 beneath the corrugated edges 55 and up around the outer sides of the container 50 where it is secured by a ring 58. As best shown in Figure 6A the band or ring 58 thus holds the screen or cloth 57 tightly across the open bottom 56 of the container 50. The corrugated bottom edges 55 of the container 50 prevent seepage of the material being filtered around the outside edges of the container. If desired a filter aid is built up on the screen or cloth 57 to prevent the fine solid materials from passing through the filter.

The container 50 is set into a double walled funnel member 60 having spaced walls 61 and 62. The funnel member directs the filtrate to a valved pipe 63 leading to the main drain line 64.

A petcock or valve 65 may be provided in the branch pipe line 63 to tap off test samples or to drain the filtrate until it runs clear before allowing it to pass into the main drain line 64. A vacuum line 69 may be inserted in the branch pipe 63 to create a differential pressure between the oil in the container 50 and the funnel member 60.

Heating coils 66 surround the container 50 and the funnel member 60 in the box 52. These heating coils are provided for maintaining the material being filtered in a heated condition so that it will be highly fluid. Since the filtrate need not be maintained in the heated state a double walled funnel member described above is provided to prevent heat from passing through the funnel member.

As shown in Fig. 7 the heating coils 66 are fed from a steam line 67 and drained by means of a pipe 68.

In addition to the vacuum line 69 described above for creating a differential pressure, it is obvious that the dirty liquids being filtered may be fed to the container 50 under pressure.

As shown in Figs. 8, 9, and 10 I have also provided alternative form of apparatus, permitting seepage of the dirty oil upwardly through a cake or layer of filter aid material.

I have found that if a filter aid material is merely mixed with the dirty oil to be passed through a filter, the first portion of the filtrate is generally dirty. A certain percentage of the fine colloidal dirt present in the oil remains in the filter aid material and, as filtration proceeds, the cake rapidly becomes impervious to the passage of further quantities of oil by becoming clogged up with the dirt particles.

If the oil to be filtered is heated to a high temperature, the viscosity of oil can be greatly reduced, thus lessening the cohesive force between the oil and the fine dirt particles held in suspension. The action of gravity is then free to cause the precipitation of the larger, and some of the finer particles. The particles remaining in suspension are eliminated, according to my process, by passing the oil through a filter medium or barrier of such state of porosity that the filter medium will not permit oil to pass through by gravity when the oil is at temperatures between 40 and 50° F. With some classes of oil a barrier is used that will not pass oil by gravity at 100° F.

By raising the temperature of the oil, I have found that the decrease in viscosity, accompanied by a decrease in surface tension, permits the oil to pass through the dense barrier by gravity at these higher temperatures when it would not pass through the same barrier at lower temperatures. However, the fine colloidal material will not pass through the barrier.

The filter medium or barrier is preferably built up of diatomaceous earth or filter aid material impregnated with a clean oil. This material is so dense that none of the fine dirt can pass through while the oil can pass through at the higher temperatures. If desired, a pressure differential can be used to aid the passage through the filter.

In Figs. 8, 9 and 10, the heated dry oil is fed through valve branch pipes 70 to box-like receptacles 71. The oil is preferably fed near the bottom of the receptacles 71 so that it may flow upward while, at the same time, allowing the precipitation of dirt particles to the bottom of the box. An annular flange 72 is secured to the inner side walls of the boxes 71 near the middle thereof for supporting a screen or canvas 73. A filter cake preferably of a diatomaceous earth 74 admixed with clean oil is placed on the screen 73 while an additional screen 75 rests on top of the filter material. Another layer of filter material 76 is supported on the screen 75. An additional screen 77 is placed on top of the filter aid 76.

An annular ring 78 is placed on top of the screen 77 for snugly engaging the inner walls of the receptacles 71. Blocks 79 rest on top of the ring 78 and are clamped against the ring by means of a three-armed member 81 which is secured to the bottom of the container 71 by clamps 82. The filter cakes 74 and 76 may thus be squeezed to any desired amount by tightening the wing nut 83 on the clamps 82 thereby forcing the blocks 79 down against the ring member 78 and imparting pressure between the filter cakes.

The oil thus seeps through the filter cakes 74 and 76 to the top of the receptacles 71 where it is drained through an opening 85 into the drain pipes 86.

As shown in Figs. 8 and 9, the receptacles 71 are placed in a housing 87 and are supported by shelves 88 within the housing. Steam coils 89 surround each of the receptacles 71 to maintain the same in a heated condition and thereby retain the oil in a highly fluid state.

The front plate 90 of the housing 87 is detachable and the feed and drain lines are readily detached from the receptacles 71 to permit an easy removal of the receptacles from the housing 87 so that the filter material may be replaced when it is too contaminated for efficient use.

If desired, the entire interior of the housing 87 may be maintained under vacuum by means of a vacuum line 91.

In some cases I have used a canvas, duck, or twilling filter cloth with its pores partially closed with fuller's earth mixed with clean oil to satisfactorily act as a barrier for the separation of the fine solid material from the oil. In other cases I have used fuller's earth held between two layers of canvas or screens such as shown in Fig. 10. These layers may vary in thickness from $\frac{1}{16}$th of an inch to two inches and higher. With the use of some of the barriers, gravity is sufficient to aid capillary attraction in causing passage of the oil therethrough. Where a thick barrier is used, however, a pressure differential up to 25 lbs. per square inch is desirable.

In Fig. 11, there is illustrated a filter that is similar in general construction to that shown in Fig. 10, except that the filter medium comprises a plurality of layers of superimposed cloths 100, of woven or felted manufacture, held between wire screens or other reinforcing foraminous layers 101. The cloths 100, which may be as many as from 5 to 15 in number and of suitable texture and characteristics, are directly superimposed one on top of the other without any intervening layer of a filter aid. As the filter cloths become clogged, the lowermost cloth or cloths may be removed and a fresh cloth placed on top and clamped again in place. In this way, the filtering may be continued with but short, periodic interruptions.

From the above description, it is evident that I have provided a process for the efficient removal of fine dirt particles from lubricating oils without chemical treatment and without destroying the original characteristics of the oil. According to my process, the oil is first dried to break up the slimes and emulsions therein and then filtered under heated conditions to lower the viscosity of the oil and decrease the surface tension of the oil for the dirt particles. This decrease in the cohesive force between the oil and suspended foreign particles makes possible a precipitation and separation of some of the dirt particles by gravity. The remaining dirt particles are removed, as described above, by passing the oil through a barrier which, by the action of capillary attraction, supplemented or not by an induced pressure differential, allows passage of the clean oil but retains dirt particles thereon. It will be understood that a sufficient pressure differential can be used, if desired, that will render the effect of capillary action relatively insignificant.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

The process of cleaning dirty oils, which comprises providing a deep bath of the dirty oils open to the atmosphere, heating the oil near the top of the bath above the boiling point of water but below the distillation temperatures of the oil, blowing air into the bath near the bottom thereof to agitate the oil and drive off moisture vapor therefrom until the oil is substantially dry, flowing the heated dry oil into a settling vessel, maintaining the oil in said vessel in a heated reduced viscosity condition, allowing solids to settle out of the oil in the vessel, draining off said solids and filtering the heated oil through a barrier capable of retaining the remaining solids in the oil thereon.

LAWRENCE S. WILBUR.